United States Patent [19]

Amendola

[11] Patent Number: 4,481,876
[45] Date of Patent: Nov. 13, 1984

[54] TREATMENT OF FOIL LAMINATED PAPERBOARD

[75] Inventor: Angel Amendola, Cedar Grove, N.J.

[73] Assignee: Alford Industries Inc., Ridgefield Park, N.J.

[21] Appl. No.: 442,821

[22] Filed: Nov. 18, 1982

[51] Int. Cl.³ .............................................. B30B 15/34
[52] U.S. Cl. ................................. 100/38; 100/93 RP; 264/284; 156/555; 156/583.1
[58] Field of Search .............. 100/93 RP, 162 R, 176, 100/38; 264/284, 2.7, 1.6; 156/221, 222, 555, 583.1, 582

[56] References Cited

U.S. PATENT DOCUMENTS

| | | | |
|---|---|---|---|
| 2,776,511 | 1/1957 | Klopfenstein et al. | 100/93 RP |
| 3,129,457 | 4/1964 | Carter et al. | 264/284 |
| 3,336,862 | 8/1967 | Brundige et al. | 100/162 R |
| 3,398,039 | 8/1968 | Klemm et al. | 156/555 X |

Primary Examiner—Peter Feldman

[57] ABSTRACT

A process is provided for the treatment of foil laminated paperboard stock to obtain a super smooth printing surface. The smoothness is accomplished by eliminating the surface irregularities of the foil by passing the foil laminated paperboard through a smoothing nip formed with a heated highly polished hard surface roller and a resilient roller, preferably having a nylon cover with the foil surface against the heated hard roller at a pressure whereby the thickness of the paperboard is not significantly decreased.

5 Claims, 3 Drawing Figures

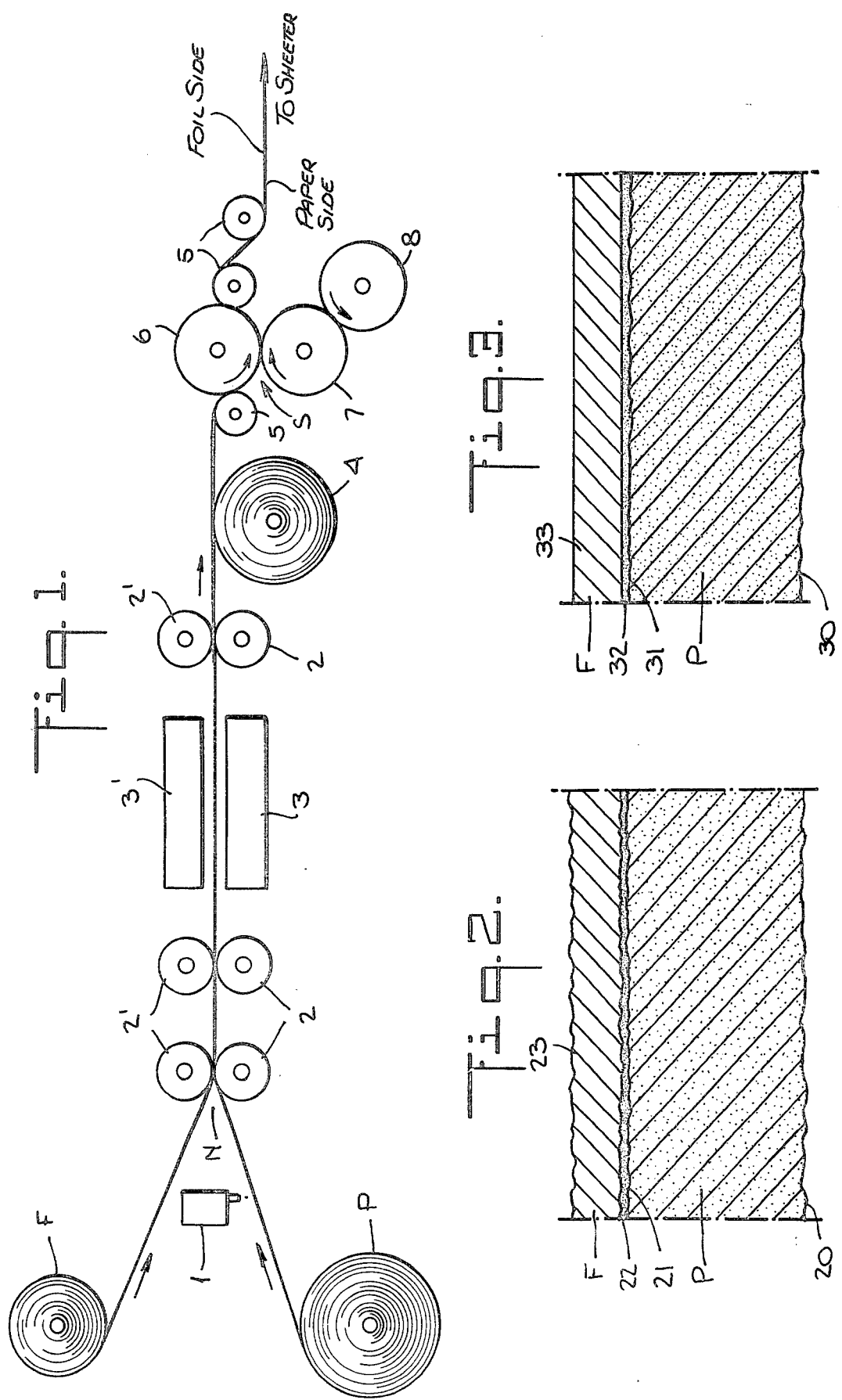

TREATMENT OF FOIL LAMINATED PAPERBOARD

BACKGROUND OF THE INVENTION (1) Field of the Invention

This invention relates to a process for producing a super smooth printing surface of foil laminated paperboard used in the folding carton industry. More particularly, it relates to smoothing the foil printing surface of a foil laminated paperboard by passing the laminate through a nip formed by a hard roll and a resilient roll.

(2) The Prior Art

Heretofore paperboard suppliers have performed calendering operations on paperboard to obtain a commercially accepted smoothness of the paperboard for printing or foil laminating for the general trade industry. However, when a super smooth foil laminated printing surface is desired the present alternative is to use a coated paperboard stock, which requires a special coating to be applied to the paperstock surface in a separate operation. This separate step increases the costs of the paperboard stock.

Prior art attempts to provide a smooth printing surface having primarily involved calendering or super calendering operations to smooth coated papers. One such example is U.S. Pat. No. 3,336,862 to Brundige et al which teaches calendering a web of double coated paper using a calender stack having a resilient covered roller. The resilient rollers of Brundige et al are used primarily to increase the gloss of the coated paper; whereas, the resilient roller used in the process of the present invention does not calender but serves to smooth the surface of a foil laminate.

U.S. Pat. No. 3,230,867 to Nelson describes a calendering mechanism which includes a resilient subordinate roll, e.g., a cotton filled auxiliary roll to help calender, and a heated metal roll, and may be used in connection with the paper machine or on a coating machine. The cotton filled rolls described in Brundige et al and Nelson do not perform well in the process of the present invention because the cotton rolls transfer any imperfection in the roll surface to the paperboard material because the cotton roller surfaces are not sufficiently hard and resilient to resist imperfections.

SUMMARY OF THE INVENTION

In order to obtain a super smooth printing surface a process is provided whereby uncoated paperboard having a foil laminated thereto is passed through a nip formed with a heated, highly polished hard surface roller, e.g., a chrome surfaced roller, and a resilient roller, e.g. nylon covered, with the foil side against the heated highly polished hard surface roller. Pressure is applied only to the surface which acts to smooth the "hills" of the foil surface. The heat transmitted by the hard roller melts the adhesive between the foil and the paperboard which fills the "valleys" of the paperboard.

A principal object of this invention is to provide a super smooth or matte finish on foil laminated uncoated and uncalendered paperboard.

Another object of this invention is to provide a process for producing a super smooth foil printing surface by smoothing the surface of the paperboard without increasing the density of the paperboard.

These and other objects of the invention will best be understood by reference to the following drawings and detailed description of the invention.

BRIEF DESCRIPTION OF THE DRAWINGS

FIG. 1 is a diagrammatic view schematically illustrating the process of the present invention.

FIG. 2 is an enlarged and exaggerated illustration of a cross section of a sheet of laminated paper stock prior to treatment according to the present invention.

FIG. 3 is an enlarged and exaggerated illustration of a cross section of a sheet of laminated paper stock after treatment according to the present invention.

DETAILED DESCRIPTION OF PREFERRED EMBODIMENTS OF THE INVENTION

Referring now to FIG. 1 of the drawing, a traveling web of uncalendered paperboard P is passed through glue station 1. A traveling web of foil F is jointed to the paper web at nip N and the foil is laminated to the paper by passing between rollers 2, 2' and heater 3, 3' whereupon the laminated paperboard may then be rewound 4. The paperboard used in the process of this invention is usually on the order of 10 to 36 caliper. The foils may be metallic foil or metallized plastic. Any one of the commonly used foils, such as aluminum, gold, silver, copper or and the like may be used. The foils normally range in thickness from 0.00028 mils to 0.005 mils, preferably from 0.003 mils to 0.0001 mils, but any thickness that can be used in the printing industry can be managed with the process of this invention.

The laminated paperboard is then treated according to the process of this invention by passing the laminated paperboard through smoothing nip S. The laminated paperboard is passed around first guide roller 5 to place the foil side of the laminate against heated, highly polished hard roller 6. Hard polished roller 6 may be chrome, stainless steel or other material as long as it is highly polished and provides good conductivity. The hard roller is heated to a temperature of from about 280° F. to about 400° F.

Smoothing nip S is formed by polished hard roller 6 and resilient roller 7, which serves to treat the traveling web from roll 4 as it passes through smoothing nip S wherein the surface 23 of foil F is smoothed. The smoothed foil surface of laminated paperboard is conducted away from smoothing nip S and passed around further guide rollers 5 to a sheeter or rewinder. The temperature of resilient roller 7 is maintained at or about room temperature by contact with chill roller 8. The temperature of chill roller 8 is not critical as long as it is maintained at a temperature which when contacted with resilient roller 7 will keep the temperature of that roll as desired. It has been found that chill roller 8 may preferably be kept at about 32° F. to about 40° F. with chilled water. The surface of resilient roller 7 is chilled without pressure, using merely the force of friction between the chill roller and the resilient roller.

Resilient roller 7 is comprised of a metal mandrel having an integral connected core and an outer cover of plastic or elastomer composition, which cover has been placed on the mandrel by a conventional shrink fitting process. It has been found that certain elastomer compositions may be employed as the outer cover for the resilient roller as long as the cover has a hardness between about 100 and 150 Shore D durometer under operating conditions.

The roller must also possess suitable resistance to damage. By the term "suit damage-resistance" it is understood to mean such resistance that the elastomeric composition cover will be able to resist and/or recover from the tendency to become permanently indented and marked when the foil paperboard laminates pass through the smoothing nip. The resistance and recovery must be at least to the extent that indentations occuring in the elastomeric cover are not injurious to the surface of the laminated paperboard.

The elastomeric covers which have been found to be successful as outer covers for the rolls of this invention are covers of any one of the following polymers: polyamide polymers sold under the tradename "nylon" and defined as nylon 6, nylon 666, polycaprolactam; nylon 6/6-6, polyhexamethylene adipamide; and nylon 11, poly-w-amino-undecanoic acid, all of which are well known polymers and are readily defined in the literature, as for example in Modern Plastics, Encyclopedia Issue for 1961, pp. 90–94: and a polycarbonate polymer sold under the tradename "Lexan" which may be defined as a polyaryl carbonate manufactured by the General Electric Company and prepared by reacting phosgene with bisphenol A. It is preferable to use plastic covers of about 1½ inches in thickness, but covers of greater or lesser thickness may be employed.

While it has been found that an elastomeric covered rollers should possess a hardness value of at least 100 Shore D durometer in order to produce an improved super smooth matte finish, the preferred range of hardness lies between about 120 and 140 Shore D durometer for the best results. Rollers having a softness less than 100 Shore D durometer are not desired because smoothing the foil surface is not obtained.

Turning now to FIG. 2, there is shown an enlarged and exaggerated cross-section of a foil laminated to uncalendered paperboard prior to treatment according to this invention where P represents uncoated uncalendered paperboard and 20, 21 illustrate the uneven surfaces of the paperboard as hills and valleys. The foil F having only a relatively smooth front surface 23 is laminated to the paperboard web at glue line 22. Because foil F is conformed relatively closely to the uneven surface 21 of paperboard P during lamination it is difficult to obtain a super smooth surface 23 using uncoated paperboard without using nip pressures that crush the paperboard. Thus, the effect of this invention is to provide a super smooth surface to foil surface 23 of paperboard P without crushing the paperboard, i.e., increasing the density of the paperboard or decreasing the thickness.

A laminate having been treated according to the process of this invention is shown in the exaggerated cross section of FIG. 3 wherein paperboard P is shown with surfaces 30 and 31 still having hills and valleys and foil F laminated to the paperboard at glue line 32 having a super smooth matte finish 33. In the cross-section shown in FIG. 3 the pressure of smoothing nip S has only been applied at the surface to smooth the foil surface and the glue melted and most of the glue caused to flow into the valleys. The laminated paperboard shown in FIG. 3 when treated according to the process of this invention shows no loss of board caliper and possesses a consistent super smooth surface for printability.

EXAMPLE 1

As showing the nature of the process of this invention and resultant product, employing a nylon roll to smooth foil laminated paperstock, the following illustration sets forth the preferred method. An aluminum foil web of 0.0003 mils thickness was laminated to a web of uncoated, uncalendered paperboard of 12 caliper thickness.

The laminated paperboard was then passed though a smoothing nip at a pressure of about 400 pounds per linear inch, formed by an 11 inch diameter×46 inch chrome surface roller and a 16 inch diameter×46 inch roller having a heat shrunk nylon 666 covering 1½ inches thick. The chrome surface roller was heated to 310° F. and the heat at the nip was applied for about 0.01 seconds. The nylon roller was maintained at about room temperature. The pressure was applied only at the surface to a depth of 0.0004 maximum.

The foil laminated paperstock treated according to the above method has the following properties:

| Property | Before Treatment | After Treatment |
| --- | --- | --- |
| Thickness | 12 caliper | 12 caliper |
| Gloss | Foil look | Foil look |
| Printing smoothness | Good | Excellent |
| Brightness | Foil look | Same as before treatment |

The printing smoothness exhibited by the super smooth laminated paperboard was excellent. The ratings of good and excellent have been arbitrarily assigned. The results clearly show the increased smoothness obtained using the process of this invention. It was also found that when sufficient pressure was applied at the smoothing nip to crush a laminated 12 caliper paperboard below about 11.8 caliper, the printability of the foil surface was unacceptable.

While herein has been shown and described the preferred form in which the invention may be embodied, it may readily be understood that various other variations and modifications in the invention may be attained without departing from the spirit and scope of the novel concepts thereof.

What is claimed is:

1. A process for smoothing a foil laminated paperboard which comprises, passing a foil laminated paperboard through a smoothing nip formed by a heated polished hard surface roller and an elastomer covered resilient roller with the foil surface against the polished roller at a nip pressure maintained to smooth the surfaces of the paperboard, the adhesive used to laminate the foil to the paperboard being melted by the heat transmitted by the hard roller and most of the adhesive caused to flow-into the valleys on the surface of the paperboard.

2. The process according to claim 1 wherein said paperboard is uncoated and uncalendered.

3. The process according to claim 2 wherein said paperboard has a thickness between 10 and 36 caliper.

4. The process according to claim 1 wherein said foil is aluminum and has a thickness between 0.00028 mils and 0.005 mils.

5. The process according to claim 1 wherein said elastomer cover is nylon.

* * * * *